United States Patent [19]
Ågren

[11] Patent Number: 6,010,441
[45] Date of Patent: Jan. 4, 2000

[54] DEVICE FOR HANDLING AND STORING OF CUTTERS AND SPACERS FOR A SLITTER WHICH SLITS COILS OF MATERIAL SUCH AS STEEL, ALUMINUM OR PLASTICS

[75] Inventor: Björn Ågren, Tystberga, Sweden

[73] Assignee: Transman AB, Trosa, Sweden

[21] Appl. No.: 09/164,679

[22] Filed: Oct. 1, 1998

[30] Foreign Application Priority Data

Oct. 27, 1997 [SE] Sweden .................................. 9703899

[51] Int. Cl.[7] ............................. B23Q 3/157; B26D 1/24
[52] U.S. Cl. ................................ 483/1; 83/481; 483/13; 483/31; 483/63; 483/901
[58] Field of Search .................................. 483/1, 13, 58, 483/901, 902, 51, 54, 31, 55, 63, 60, 69, 27; 72/442; 83/479, 481, 480, 495; 901/16, 30, 41, 42; 414/788.7

[56] References Cited

U.S. PATENT DOCUMENTS

| | | | |
|---|---|---|---|
| 3,513,743 | 5/1970 | Montguire | 83/479 X |
| 3,621,527 | 11/1971 | Michalak | 83/479 X |
| 3,800,648 | 4/1974 | Nishiyori et al. | 83/481 X |
| 4,557,655 | 12/1985 | Berg | 414/788.7 |
| 5,044,064 | 9/1991 | Muselli | 483/901 X |
| 5,183,377 | 2/1993 | Becker et al. | 901/16 X |
| 5,595,560 | 1/1997 | Kamada | 72/442 X |
| 5,735,782 | 4/1998 | Berg | 483/1 |

FOREIGN PATENT DOCUMENTS

| | | |
|---|---|---|
| 0444047 | 9/1991 | European Pat. Off. . |
| 0783942 | 7/1997 | European Pat. Off. . |
| 2018183 | 10/1979 | United Kingdom .................... 83/479 |
| 9609145 | 3/1996 | WIPO . |

*Primary Examiner*—William Briggs
*Attorney, Agent, or Firm*—Nils H. Ljungman & Associates

[57] ABSTRACT

A device to assemble cutter assemblies of cutters and spacers for a slitter for slitting coils of steel, aluminum, plastic or other material. The storage region of cutters and spacers uses the head room above the floor-area and is served by a robot that is able to simultaneously carry several tool units. The storage region contains storage units which project substantially vertically from the floor. The storage units include substantially horizontal projections for storage of the cutters and spacers.

20 Claims, 4 Drawing Sheets

DEVICE FOR HANDLING AND STORING OF CUTTERS AND SPACERS FOR A SLITTER WHICH SLITS COILS OF MATERIAL SUCH AS STEEL, ALUMINUM OR PLASTICS

BACKGROUND OF THE INVENTION

1. Field of the Invention

The present invention relates before all to a cutter assembly for slitting of material coils to one or several strips of desired width or for edge-trimming. The slitting operation is performed between revolving annular cutters and spacers. The strip for slitting is preferably made of steel, aluminum or plastics. The invention is directed to rapidly changing of cutters and spacers on the arbors of the slitter also storage them within a narrow place in connection to the slitter.

The present invention relates primarily to a device to store and move cutters and spacers for the cutter assembly for a slitter mill for slitting or cutting coils of materials. The coils can be cut to a strip or strips of desired width. Additionally, the cutter assembly can be used for trimming the edges of coils of material. The present invention relates to a rapid changing of the cutters and spacers of the cutting assembly, and the storage of the cutters and spacers.

2. Background Information

Longitudinal slitting of coils of large width is preferably performed in a cutter assembling means or a slitter between two cutting rings or annular cutters, situated above each other and overlapping. The strip is directed in between two horizontal arbors, mutually parallel disposed above each other and equipped with dish shaped cutters and intermediate spacers. The spacers are for getting desired width of the slit strip. The two arbors are in the ends mounted in bearings in two frame portions. The frame portions are often disposed on the same base plate.

To explain, the lengthwise (longitudinal) slitting of wide coils of material can preferably be performed by a slitter, or cutter, or cutter assembly, or slitter mill which contains two annular cutters. The annular cutters can be positioned so that they are disposed substantially one above the other. Also the cutting surfaces of the cutters can at least partially overlap.

The strip to be slit can be directed between two horizontal arbors, which two horizontal arbors can be substantially parallel to each other with one disposed substantially directly above the other. The arbors can be equipped with one or more dish or disc shaped cutters and can also be equipped with one or more spacers. The spacers can be designed and positioned to separate the cutters so as to cut the strips or slits of material to the desired width. The arbors can be supported by a frame. The frame can have two substantially vertical portions, which vertical portions can support the arbors. The vertical portions can also contain bearings to support the arbors. The vertical portions can also be supported by a common base plate.

When changing for example of the width and/thickness of the desired strips, changing the material, and depending on the wearing out of the cutters on the arbors, the tool set must be reassembled and new be assembled. The lists of orders of course also determine how often the tool sets must be changed. New slitters have high output, often with a slitting speed up to 600 meter per minute or sometimes higher. The capacity of the slitter assembling means highly depends on the time for reassembling and assembling of the tool sets.

Several situations can result in the need for disassembly and removal of the spacer and slitter assembly and then assembly and replacement of a different slitter assembly. An obvious example is when there is a desire to cut different size strips. It can then be necessary to replace the cutter assembly with cutters and spacers properly aligned for the new product size. Similarly, if the material to be cut is different, different cutters may be needed to properly cut that material. Also, the spacers, and particularly the cutters, can become worn and replacement can then be required to maintain proper cutting tolerances. The list of orders or production requirements can also affect the need to replace the cutters and spacers. With slitter assemblies often capable of outputs in excess of about 600 meters per minute, the time required for removal, assembly and installation of the cutter and spacer sets can greatly affect the overall output of the system.

Reassembling and assembling of tool sets makes now preferably in two different ways. One way is to move the whole package of frame portions including the arbors and the cutters and spacers to a separate place and replace the tool sets with new. Sometimes it is possible to make some changes of the tools and direct replace the tool set in the slitter. The other way is that one of the frame portions is reassembled in a well known way to lay one end of the arbor free and then reassembling and assembling the tool sets when the arbors are still in place. Such a slitter is described among others in EP 0444047 and EP 0783942.

The last mentioned way above is to be preferred most of the users of slitter and says depends on that the means are cheaper. Many users also say that this way is faster if the tool sets are changed in an advanced way.

Different methods can be used for the assembly and installation of cutter or tool sets. One option requires the removal of the entire frame portion, along with the associated arbors and tool sets from the slitter machine. Once removed, the tool sets can be accessed for the replacement of the cutters and spacers. The frame and associated tool sets can then be replaced into the slitter machinery. While generally the entire tool set is changed, in some cases it may be possible to change some portion of the tool sets while still installed in the slitter. Another option for the removal of the tool sets calls for the removal of just one of the frame portions. Upon removal of one of the frame portions, the tool sets can be removed, reassembled and reinstalled while the arbors remain in place, held by the other frame portion. The removed frame portion can then be reinstalled and the slitter can then once again be ready for operation. The latter method of replacement of the cutters and spacers is generally preferred, as it is commonly believed to be more time and cost efficient to replace the slitters in this manner.

The easiest way of changing tool sets is to loosen the cutters and spacers from the arbors and one after one by hand or with help of somewhat common equipment reassemble the tools and then assemble new cutters and spacers.

In the patent EP 0783942 is described a set-up device to facility change the whole tool set. The set-up device is built up of an upright, equipped with in pairs above each other situated bars similar to the arbors on the slitter. The set-up device will preferably at least be equipped with four in pairs placed bars oriented in different directions. The set-up device is adapted to be moved between a mounting station and a docking station at the mill stand. The pairs of bars of the set-up device are docked with the arbor pair. For this purpose the end wall of the mill stands can be opened. The used tool set is pushed over to the bars. New bars on the set-up device are now docked with the ends of the arbors and newly built up tool sets are pushed over to the arbors. The movements of the tool sets on the bars and arbors are made by pushers on the set-up device or the slitting stand or on both.

In other words, the patent EP 0783942 describes a device to facilitate the removal and replacement of an entire tool set. Projections similar to the arbors on a slitter are disposed on an upright portion. The projections can be substantially parallel to one another. There can preferably be at least two such pairs of projections on the device, with each pair extending in a different direction. The device can be designed to move between a first position and a second position. In the first position the device stores the arbor sets. In the second, docked position, a pair of projections can dock with the arbors of the cutter. Upon docking, the used tool set can then be pushed onto the bars. The device can be rotated so another pair of bars, carrying the replacement tool set, can be docked with the arbors, and the new tool set can be transferred to the arbors. The device for removal and replacement and or/the slitter itself, can be equipped with pushing mechanisms to push the old tool sets off of the arbors and the new tool sets onto the arbors.

The storage of the cutters and spacers is made by stocking them in a place near the slitting stand or the slitting stands if more than one slitting stand are used. The storage place can be extensive. The best way of building up the space between two cutters is to pair together spacers of different thicknesses to one unit in order to gets the desired widths of the slitted coils. These spacer sometimes can have up to one hundred different thicknesses or even more. It is also necessary to magazine many different cutters. Moving the tools between the stockage and the stand is executed in the simplest way by hand. Equipment, for example robots, can sometimes be used, As the cutters and spacers often magazines on a horizontal floor the extend of the storage will be large. Being also in mind that each tool set can be built up by up to 30 parts and the robot is able to move only one part each time the moving time will be extensive.

In other words, the cutters and spacers can be stored in an area near the slitting machine. Due to the number of cutters and spacers involved, and the number of combinations of cutters and spacers for all of the different materials and sizes of strips to be cut, an extensive storage area can be necessary. For example, it may be necessary to have more than 100 different sizes of spacers available to set up the tool sets for the correct width of material to be cut. Also, each tool set can possibly include 30 or more cutters and spacers. Due to the number of components involved, an extensive amount of time can be required to correctly assemble all of the stored tool sets.

SUMMARY OF THE INVENTION

Surprisingly it has appeared a way to make a very compact storage, get short haulage ways, rapidly change the tool sets and on the whole increase the output by making a robot with a robot head that can be moved three-dimensional within the storage, that is up and down, forwards, backwards and sideways. The robot head is also able to be turned round its vertical axle. The head is equipped with a casing that has an expanding envelope surface, that are able to grasp and simultaneously retain a couple of cutters and spacers.

In other words, in order to minimize required storage space, minimize the time required to change the tool sets, and in general to increase the output of the slitting machine, a robot moving assembly is provided with a head that can be moved three-dimensionally within the storage area. Additionally, the robot head can have an axle, possibly a vertical axle, about which the robot head can rotate. The robot head can be equipped with a casing, which casing can contract in order to be put inside the tool sets and can expand in order to hold the tool sets so positioned.

The above discussed embodiments of the present invention will be described further hereinbelow with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The present invention will be described in greater detail below, with reference to at least one embodiment illustrated in the accompanying drawings, wherein.

DESCRIPTION OF THE PREFERRED EMBODIMENT

The present embodiment is at least one possible variant or embodiment of the present invention. Other embodiments are also possible.

Figure 1:
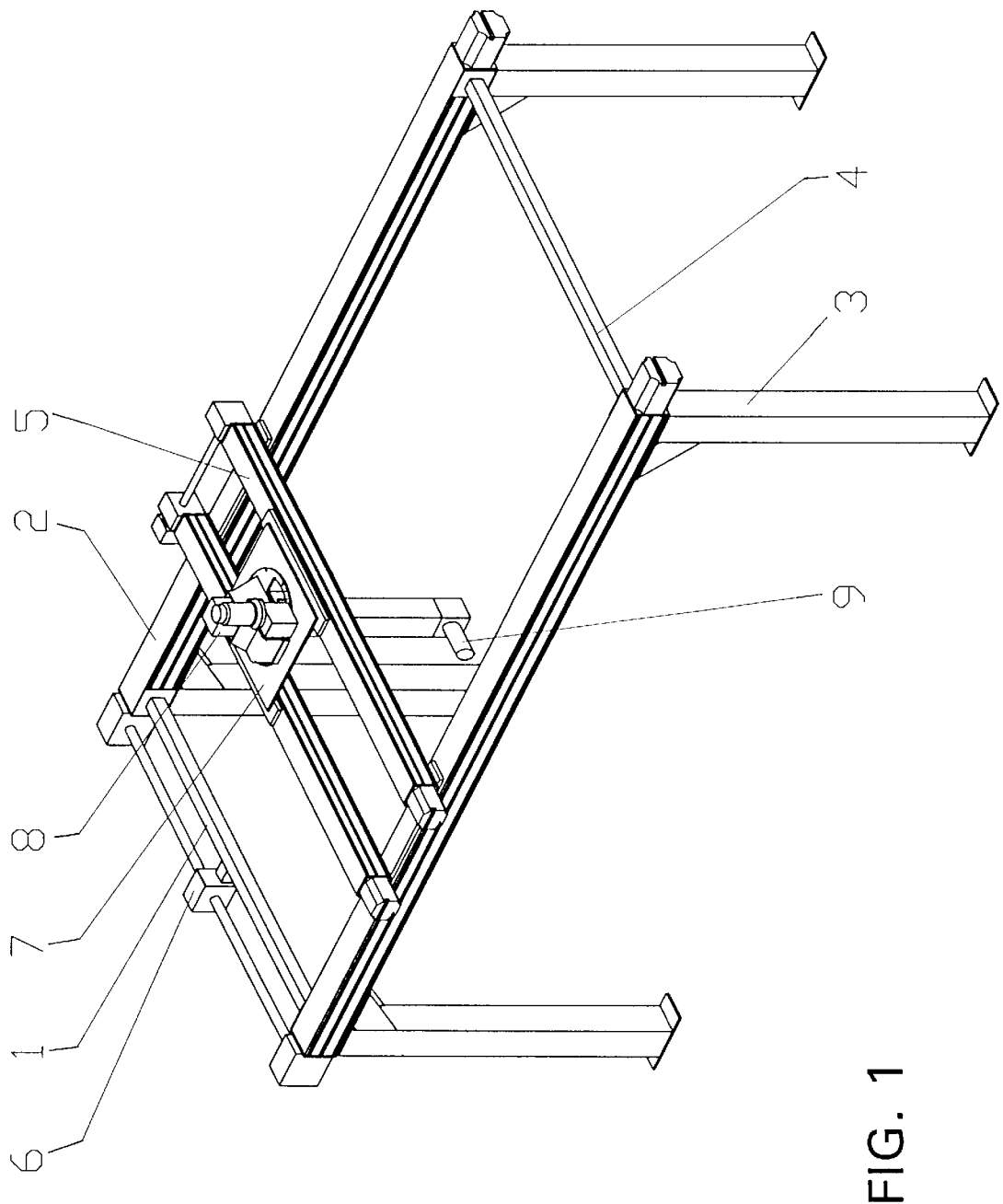
FIG. 1 shows a perspective view of a possible embodiment of a robot that is able to be connected to a storage area.

FIG. 1 shows a robot 1 includes a stand 2 with an extend that allows the robot 1 to act over the whole storage. The stand includes four uprights 3 in each corner of the storage. The uprights 3 are at their tops kept together by four horizontal crossbars 4 along the four sides of the storage. A carriage 5 is movable backwards and forwards in the horizontal plane on two parallel crossbars 4. The carriage 5 is operated by a motor by way of a cogged endless belt. The belt runs along one of the crossbars 4. A transversal carriage 7 is crosswards running above the longitudinal carriage 5. This carriage 7 is also operated by a motor by way of long screws. A vertical bearer 8 is mounted on the transversal carriage 7 and is movable vertically up and down. At the bottom of the vertical bearer 8 is mounted a robot head 9 equipped with a horizontal projecting gripping appliance 10. The robot head 9 is movable in a plane transversely to the vertical axle of the bearer 8.

In other words and in accordance with at least one embodiment of the present invention, a robot 1 can include a stand 2. The stand 2 can have an extending portion which allows the robot 1 to operate within substantially the entire storage area or region or space. The stand 2 can include upright portions 3, with each upright portion 3 disposed to form a different corner of the storage area. The upright portions 3 can be connected at the top by horizontal crossbars 4, which horizontal crossbars 4 can define the sides of the storage area. A carriage, or longitudinally running carriage, 5 can be movable horizontally on two of the crossbars 4, which two crossbars 4 can be substantially parallel to each other. The carriage 5 can be operated by, for example, a motor 54 (see FIG. 5) which can be connected to the carriage by a cogged endless belt 53 (see FIG. 5). The belt can be disposed to run substantially along, for example, one of the crossbars 4. A second or transverse carriage 7, can be disposed to run substantially transverse to the longitudinal carriage 5. The transverse carriage 7 can also be operated by a motor through a threaded shaft or screw. The motor driving the transverse and longitudinal carriages can be, in alternative embodiments of the present invention, either the same motor, or different motors. Mounted to the transverse carriage 7, can be the bearer or lifter or mount 8 which operates substantially vertically in the storage space. A robot head 9 is mounted on the bearer 8 at the bottom of the bearer 8. The robot head 9 can have a projecting gripping part or extension or appliance 10. The head 9 can rotate in a plane substantially transverse to the axis of the bearer 8.

Within the radius of the robot head 9 (FIGS. 2 and 3), stock units 11 are mounted. Each stock unit 11 has a vertical, rectangular frame structure 12. Projecting out from one or both vertical sides of the frame structure 12 are mounted a number of suspension attachments in the shape of thick-walled pipes 13. The outer diameters of the pipes 13 correspond to the outer diameter of the horizontal arbors in the cutter assembling means that shall be served from the storage. A number of necessary annular cutters 14 and spacers 15 are magazined on these pipes 13. The distance between adjacent pipes 13 shall at least be so far, that the cutters 14 or spacers 15 did not brush the tools placed nearby each other when moving the tools alongside the envelope surface of the pipes 13. To each pipe, 13 a pusher 16 is connected. The pusher is used to push all tools magazined on the pipe 13 in question outwards from the frame structure 12.

Figure 2:
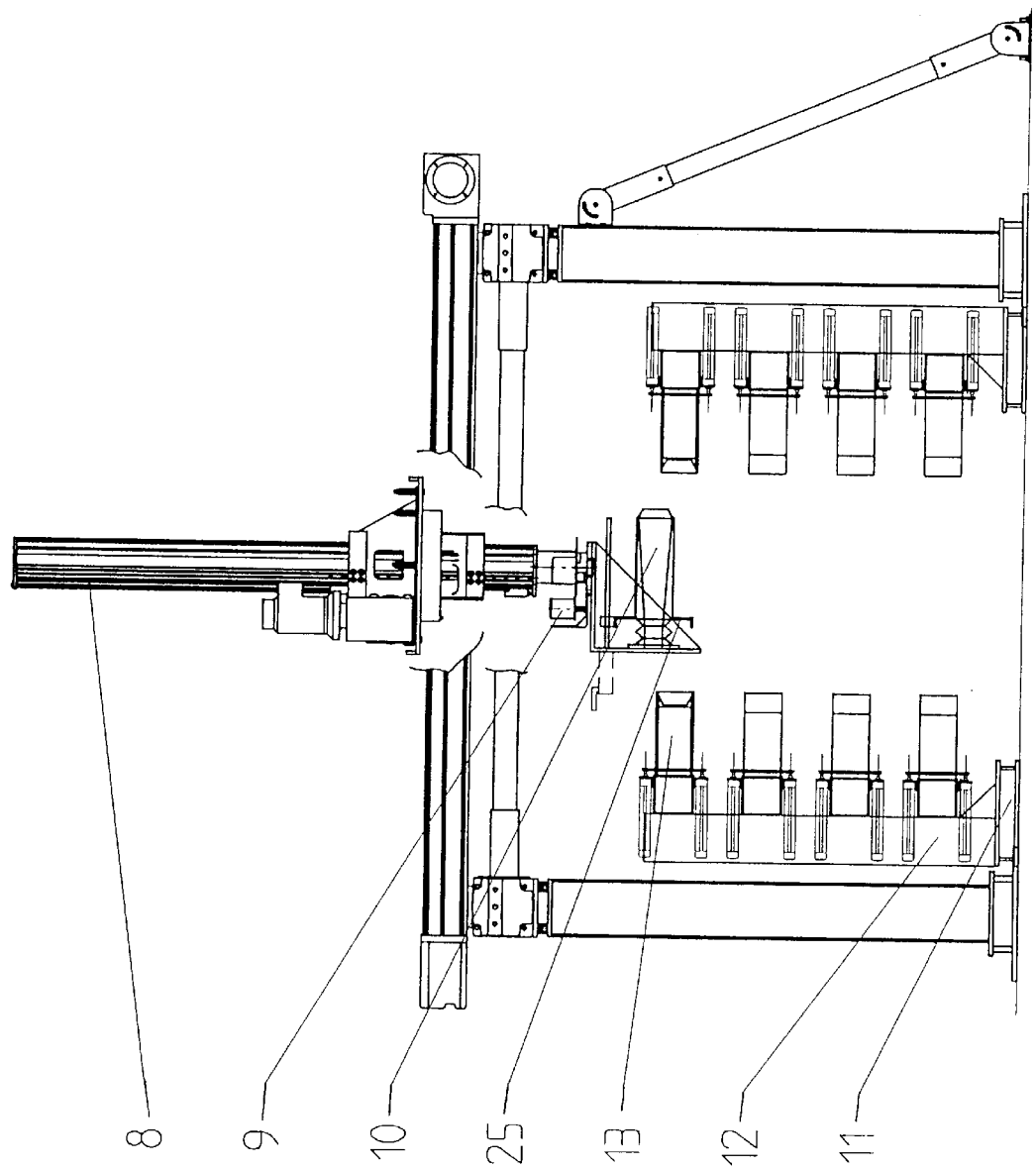
FIG. 2 shows a cross section of a storage area.
Figure 3:
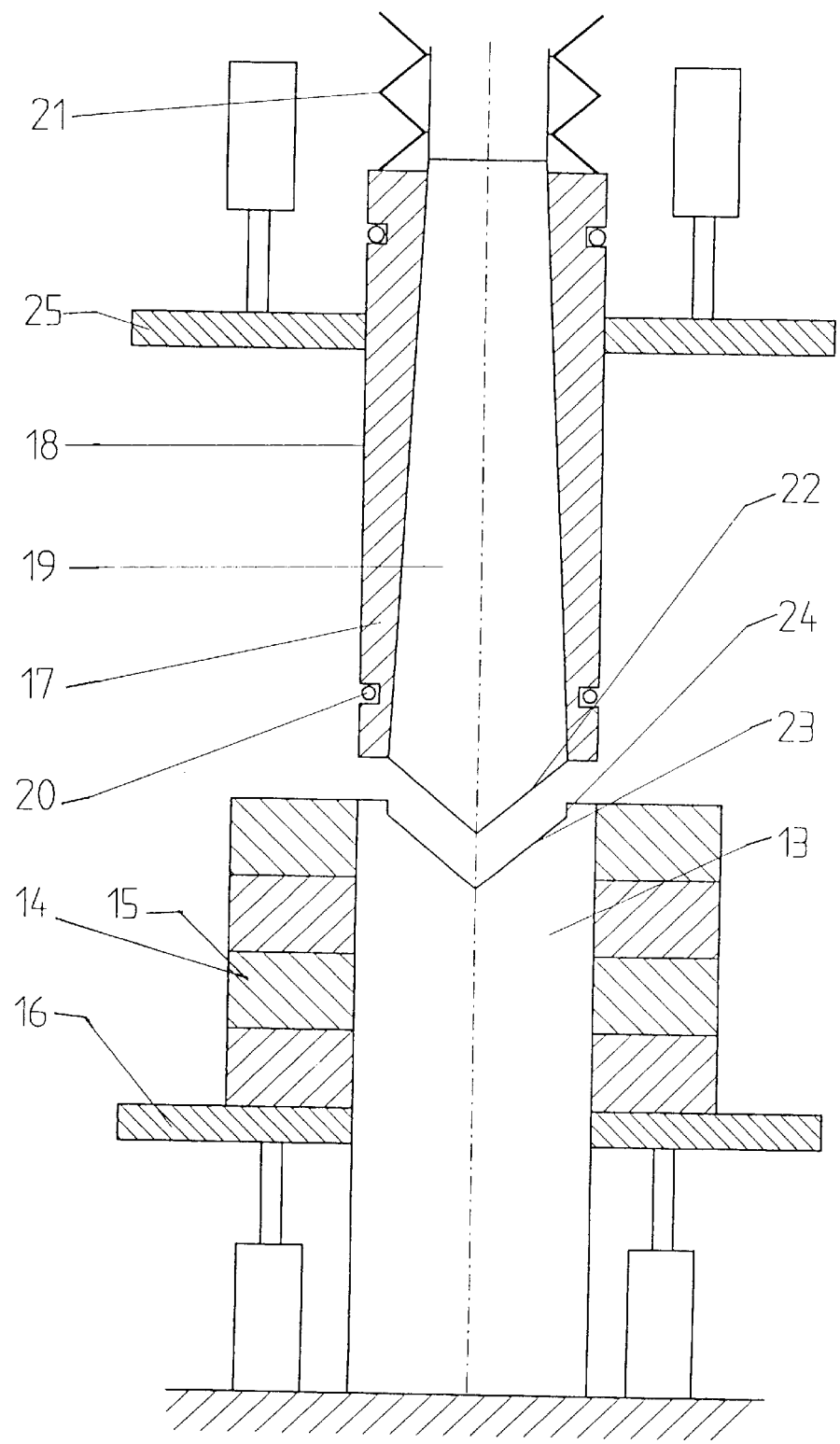
FIG. 3 shows a longitudinal section of a gripping device on the robot head.

In other words, as indicated in FIGS. 2 and 3, stock units 11 are mounted within the reach of the robot head 9. Each stock unit 11 has a vertical rectangular frame structure 12. Projecting from one or both sides of the frame structures 12 are projections or pipes or suspension attachments 13. The outer diameter of the pipes 13 are sized so that various cutter assemblies can be placed over various pipes 13. Standard combinations of cutters 14 and spacers 15 can be prearranged or magazined on pipes 13. The pipes are spaced a sufficient distance from one another so that adjacent sets of cutters 14 and spacers 15 will not contact each other when stored on the pipes 13. Each pipe 13 can also be equipped with a pusher or pushing device 16 to push the cutters 14 and spacers 15 along the pipes 13 away from the frame structures 12.

The gripping appliance 10 on the robot head 9 is meant to grip the on that occasion selected cutters 14 and spacers 15 from the storage and leave them direct to the cutter assembly or to a set-up device or vice versa. The gripping appliance has an expanding casing 17 horizontally projecting out from the robot head 9. The exterior diameters of the expanding casing 17 match the inner diameter of the cutters 14 and spacers 15 in a way that the tools easily can be moved along the envelope surface 18 of the expanding casing 18 when the casing 18 is pressed together. When expanded the cutters 14 and spacers 15 are retained depending on the frictional drags.

In other words, the gripping appliance or device 10 of the robot head 9 can be designed to grip the selected cutters 14 and spacers 15 from the storage area, and to carry them to either a set-up area or directly to a slitter or cutter assembly for installation on the cutter or slitter. The gripping appliance can also work in the reverse direction, carrying the selected cutters 14 and spacers 15 from the cutter assembly and to the storage area. In at least one embodiment, the gripping device 10 has a casing 17, with an outer surface 18, which casing 17 can expand to essentially match the inner diameter of the cutters 14 and spacers 15. When the casing 17 is contracted, the cutters 14 and spacers 15 have sufficient radial clearance to easily move along the surface 18 of the casing 17. When the casing 17 is expanded so that the surface 18 contacts the cutters 14 and spacers 15, the cutters 14 and spacers 15 are substantially held on the gripping device 10 by frictional forces.

The inner envelope surface of the casing 17 is a little tapered in such a way that the less diameter is placed against the robot head 9. The casing 18 is surrounding the surface of a mandrel 19. The envelope surface of the mandrel 19 correspond to the inner surface of the casing 17. The mandrel 19 is stiff connected to the robot head 9. The casing 17 is transversally split up in three parts, that are held together round the mandrel 19 by springs 21 round the envelope surface 18. The length of the casing 17 is limited to the maximum load of tools the robot 1 is able to carry. The free end of the casing 17 and the mandrel 19 just coincides when the casing 17 is expanded. The casing 17 is at this moment kept outwards a limited way of compression springs 21. The free end of the mandrel 19 is finished with a cone 22 that fits to a corresponding cavity 23 in the outer end of the pipes 13 on which the cutters 14 and spacers 15 are magazined. Similar cavities 23 are also to be find in all ends, where the gripping appliance 10 is intended to be docked. The meaning of this is to better guide the gripping appliance 10 to the ends when docking. The cavities 23 are outwards finished in a cylindric part 24 that allows the cone 22 to penetrate the end surface a little bit more. In this way the casing 17 is free to compress the compression springs 21 a little way. The width of the casing 17 will now be reduced depending on that the casing 17 moves on the tapering in a direction of the compression springs 21. The cutters 14 and spacers 15 are now allowed to be freely moved on the casing 17. When after that the gripping appliance 10 is moved away from the cavities 23 the casing 17 is again expanded and the cutters 14 and spacers 15 will be retained. The gripping appliance 10 also contains a movable holder-up 25 that is movable along the envelope surface 18 of the casing 17. The position of the holder-up 25 is carefully adjustable. The robot 1 and the storage 11 are connected to a computer. The computer regulates the different movements. The computer also regulates the whole cutter assembling means and gets information from the backlog of orders.

Figure 4:
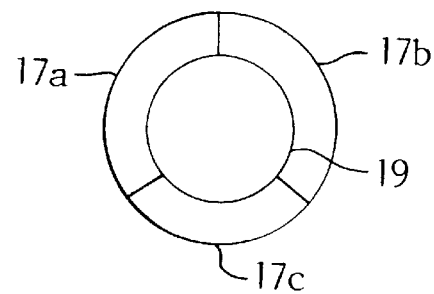
FIG. 4 shows a cross section view of a casing and mandrel.

In other words and in accordance with at least one embodiment of the present invention, the casing 17, which casing 17 can be split into at least three distinct sections 17a, 17b, 17c (see FIG. 4), can be slightly tapered so that the wall of the casing 17 is thicker at the end nearest the robot head 9 and thinner at the opposing end. Therefore the inside diameter of the casing 17 can be smaller adjacent the robot head 9 and larger at a distance from the robot head 9. A mandrel 19 is firmly connected to the robot head 9 and is disposed inside the casing 17. The surface of the mandrel 19 can also be tapered to fit against the inner surface of the casing 17.

The casing can function as a collet for the holding of cutters and spacers on the casing 17, as described below. Alternatively, other methods of holding the cutters and spacers during transport may be available in embodiments of the present invention.

The three parts 17a, 17b, 17c of the casing 17 can be held together by springs 20, which springs 20 can be placed around the surface 18 of the casing 17. The casing 17 can be designed so that the length of the casing 17 corresponds to the maximum number of cutters and spacers that the gripping apparatus 10 is to carry at one time. The gripping apparatus 10 can be equipped with compression springs 21 which compression springs 21 push the casing 17 along the mandrel 19. The mandrel 19 itself can be equipped with an outwardly projecting cone or conical section 22. Each pipe 13 can be equipped with a conical cavity 23 which cavity 23 is designed to receive the cone 22 of the mandrel 19. Each pipe 13 can also have a cylindrical part or section 24, which cylindrical section 24 is disposed outside of the conical cavity 23 to allow a greater penetration by the mandrel 19, therefore forming a cylindrical opening adjacent the conical cavity 23. When the mandrel 19 contacts the pipe 13, the casing 17 is pushed toward the robot head 9. Because of the relative taper of the casing 17 with respect to the mandrel 19, the overall diameter of the casing 17 is reduced as the casing 17 slides on the mandrel 19 toward the robot head 9. This also at least partially compresses the springs 21. The springs 20 about the outer surface 18 of the casing 17 pull the portions of the casing 17 together as it slides along the mandrel 19. With the reduction in diameter of the casing 17, the cutters 14 and spacers 15 can now freely slide along the outer envelope surface 18 of the casing 17. The cutters 14 and spacers 15 can be pushed onto the gripping apparatus 10 by the pusher 16. When the gripping apparatus 10 is removed from contact with the pipe 13, the compression spring 21 pushes the casing 17 along the mandrel 19 and thus the diameter of the casing 17 increases to the extent that the cutters 14 and spacers 15 are firmly held by frictional forces. An additional pusher or movable holder or retainer 25 is movable along the envelope surface 18 of the casing 17. The robot 1 and the associated equipment are all controllable by a computer system to synchronize the movements of the various components. In addition to the robot 1, the pusher 16 and the holder 25 can also be controlled by the computer system. In addition, the computer can be directly connected to the slitter in order to store a task list based on the orders to be completed. In at least one embodiment, the whole slitter and storage operation can thus be computerized in order to optimize the production process.

When reassembling new tool sets the robot head 9 is docked in turn with the pipes 13 who magazines the current cutters 14 and spacers 15. The units are moved onto the casing 17 by the pusher 16 that serves the magazines in question. The number of each tool unit is determined by the position of the holder-up 25 on the envelope surface 18 of the casing 17.

In other words, the tool sets to be assembled can be essentially assembled on the gripping apparatus 10. As the robot head 9 is docked with the appropriate pipe 13, the pusher 16 for that particular pipe 13, controlled by the computer, can push the selected number of cutters 14 and spacers 15 onto the casing 17. The number of cutters 14 and spacers 15 transferred to the casing 17 can depend primarily on the position of the holder 25 on the gripping apparatus 10. Specifically, the holder 25 can move along the envelope surface 18 of the casing 17 to establish a stop position for the cutters 14 and spacers 15 which are to be transferred.

When the casing 17 is filled the robot head 9 leaves its load to the bar where the tool set shall be built up. The movement of the tools on the casing 17 is preferably made by the holder-up 25 that now works as a pusher.

In other words, after the robot head 9 picks up the cutters 14 and spacers 15 to be transferred, the robot head 9 can move adjacent either to a slitter or to a set-up area for the slitter. The tools 14, 15 can be transferred either directly to the slitter or to such a set-up area. The cutters 14 and spacers 15 can be removed from the casing 17 by the holder 25, which can act as a pusher for the removal of the tools from the casing 17.

The resetting of the tools to the pipes 13 in the storage is made in reverse order. Now the holder-up 25 is used as a pusher and the number of tool units to be left to each pipe 13 are limited by the length of movement of the holder-up 25 in direction of the pipe 13.

In other words, to replace the tools 14, 15 on the pipes 13, the above process can be repeated in essentially the reverse order. The mandrel 19 can contact the recess or cavity 23 of the pipe 13, thus causing the casing 17 to decrease in diameter (through the actions of the springs 20, 21 and the relative slopes of the mandrel 19 and casing 17 as described above.) Similarly then to the transfer of the cutters 14 and spacers 15 to the slitter, as described above, the holder 25 can act as a pusher to push the cutters 14 and spacers 15 onto the appropriate pipe 13. The number of cutters 14 and spacers 15 to be transferred can be limited by the amount of displacement of the holder 25, which can be controlled by the computer control system.

In at least one embodiment of the present invention, all of the cutters 14 and spacers 15 currently in use can be transferred to the same pipe 13. In at least one other embodiment of the present invention, the various cutters 14 and spacers 15 can be transferred to different pipes 13. Similarly, on transfer of the tool sets from storage onto the robot head 9, the tool set can be assembled from either the cutters 14 and spacers 15 on an individual pipe 13, or from the cutters 14 and spacers 15 stored on more than one pipe 13.

The present embodiment plain shows the advantages of the invention. The robots 1 way in the storage 11 and between the storage 11 and the receiver will be a good deal shortened by the compact building up of the storage 11 also by that the gripping appliance 10 at the same time handle much tool unit. Also the extension of the storage depending on the use of the head room will make it easier to place the storage 11 closer to the cutter assembly. The haulage ways are able to be very reduced.

In other words, several possible advantages of the present invention are shown in the disclosed embodiments. The total amount of storage space required can be reduced. Additionally, the total distance the robot head 9 must move to assemble the tool sets can be reduced. The smaller storage area can also be stored closer to the cutter or slitter it is intended to service. Additionally, the overall transport distances, and therefore the time required for transport, can be significantly reduced from known devices, therefore increasing the overall efficiency of the system.

Figure 5:
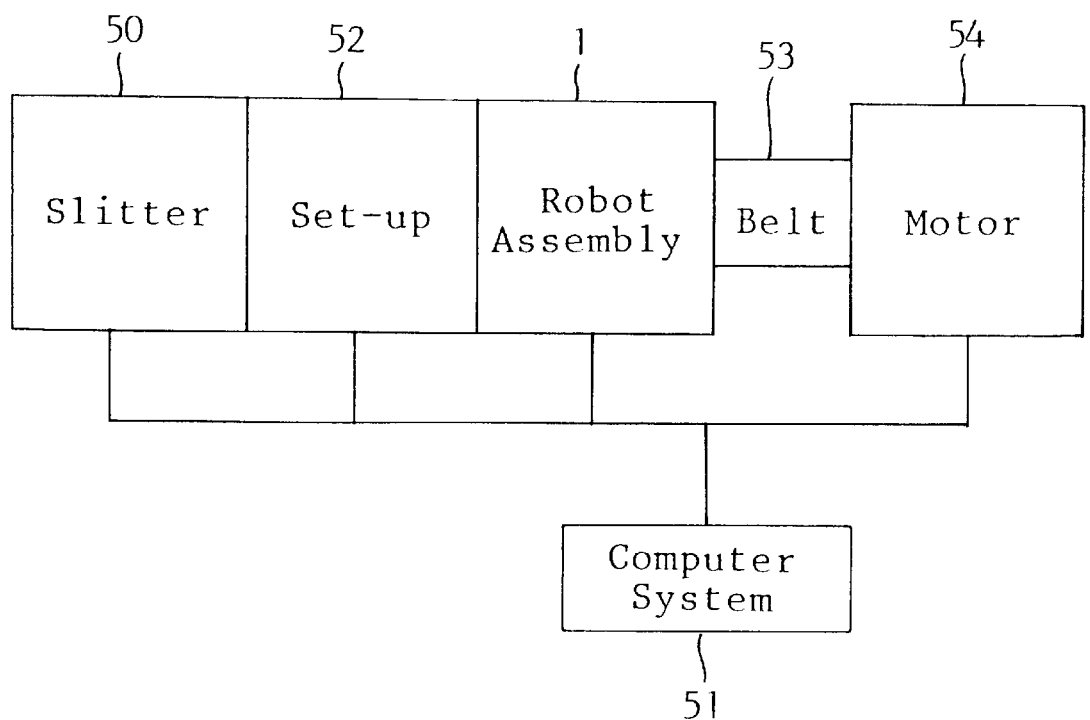
FIG. 5 shows a block diagram of a possible embodiment of a robot cooperating with a slitter.

FIG. 5 depicts by block diagram that the robot assembly 1 can cooperate with a slitter 50. Additionally, there can be a set-up area 52, as discussed above, for the transfer of tool sets and the storage of additional tool sets. The slitter robot and set-up area can all be controlled by a computer 51.

One feature of the invention resides broadly in a device for handling and storing of annular cutters 14 and spacers 15 in connection with a cutter assembling means, characterized in a storage with vertical storage units 11 said storage units 11 having horizontal projecting suspension attachments 13, each provided with a pusher 16 and on which sized cutters 14 and spacers 15 are magazined a to the storage floor fixed robot 1 said robot 1 has a vertical up and down movable bearer 8 that are running over the storage area with help of partly in one direction a movable longitudinal carriage 5 and partly in the perpendicular direction an above the longitudinal carriage 5 running transversal carriage 7 a to the bottom of the bearer 8 connected robot head 9 that are able to rotate round its horizontally axle said robot head 9 has a horizontally projecting expanding casing 17 that by frictional forces retain the cutters 14 and spacers 15 on the envelope surface 18 of the casing 17 but by docking with the ends of the attachments 13, with the arbors on the cutter assembly, with set-up device and so on release the frictional forces depending on a reduction of the diameter of the casing 17, said casing 17 has a holder-up 25, running on the envelope surface 18 the position of said holder-up determined the number of tools 14, 15 that are able to be pushed up on the casing 17 said holder-up can also be used as pusher when pushing away tools 14, 15 from the casing 17.

Another feature of the invention resides broadly in the device characterized in that the casing 17 is split in longitudinal parts, holding together by springs 20 round its envelope surface 18, its inner envelope surface is a little tapered in such a way that its narrowest diameter is near the inner end and is from its inner end by compression springs 21 pressed outwards a limited way, said casing 17 is surrounding a mandrel 19, which envelope surface corresponds to the inner envelope surface of the casing 17, and that the outer diameter of the casing 17 when pushed outwards is expanded but when pushed in the opposite direction is reduced.

Yet another feature of the invention resides broadly in the device characterized in that the outer end of the mandrel 19 is finished in a cone 22 that make the docking operation easier.

Still another feature of the invention resides broadly in the device characterized in that the device is made up with a set-up device that are movable between the robot 1 and the cutting assembling mean said set-up device has barrels in more directions for stocking tool sets.

A further feature of the invention resides broadly in the device characterized in that the device is operated by a computer.

Another feature of the invention resides broadly in the device characterized in that other device belonging to the cutter assembling means is operated by the same computer.

Yet another feature of the present invention resides broadly in a device for handling and storing cutters and spacers for a slitter mill, which slitter mill cuts strips from coils of material such as steel, aluminum or plastic, said handling and storing device comprising: at least one storage unit, said at least one storage unit having an elongated dimension; said at least one storage unit having a longitudinal axis along the elongated dimension; said at least one storage unit comprising at least one projection structure; each of said at least one projection structure comprising a projection for storage of cutters and spacers; said at least one projection having an elongated dimension and having a longitudinal axis along the elongated dimension; the longitudinal axis of said at least one projection being disposed substantially transverse to the longitudinal axis of said at least one storage unit; the longitudinal axis of said at least one storage unit being substantially vertical; each of said at least one projection structure comprising a pusher to displace cutters and spacers stored on the corresponding projection; a robot to move cutters and spacers, said robot comprising: a robot head having an elongated dimension; said robot head having a longitudinal axis along the elongated dimension; said robot head being rotatable in the plane of its longitudinal axis; the longitudinal axis of said robot head being disposed substantially transverse to the longitudinal axis of said at least one storage unit; a first carriage; said robot head being connected to said first carriage; said first carriage being disposed and configured to allow movement of said robot head in a first direction; a second carriage; said robot head being connected to said second carriage; said second carriage being disposed and configured to allow movement of said robot head in a second direction, the second direction being substantially transverse to the first direction; and apparatus to move said robot head substantially transverse to said first direction and said second direction; said robot head being connected to said moving apparatus; said moving apparatus being configured and disposed to allow movement of said robot head in a third direction, the third direction being substantially transverse to both the first direction and the second direction; said robot head comprising a casing; said casing having an elongated dimension and having a longitudinal axis along said elongated dimension; the longitudinal axis of said casing being disposed along the longitudinal axis of said robot head; said casing having a diameter, the diameter being substantially transverse to the longitudinal axis of said robot head; said robot head comprising apparatus to adjust the diameter of said casing between a first diameter and a second diameter; said robot head being configured and disposed to permit engagement of said robot head with said at least one projection; said apparatus to adjust the diameter of said casing being disposed and configured to adjust the diameter of said casing to the first diameter upon said casing not being engaged with said at least one projection, the first diameter being substantially equal to the inside diameter of stored cutters and spacers to hold cutters and spacers on said casing; and said apparatus to adjust the diameter of said casing being disposed and configured to adjust the diameter of said casing to the second diameter upon said casing being engaged with said at least one projection, the second diameter being substantially less than the inside diameter of stored cutters and spacers to allow cutters and spacers to move along said casing.

Still another feature of the present invention resides broadly in said robot head comprises a holder; and said holder is disposed and configured to limit the number of cutters and spacers which can be held by said casing.

A further feature of the invention resides broadly in the device said robot head comprises a central portion, said central portion being disposed adjacent said moving apparatus; said robot head comprises a mandrel, said mandrel has an outer surface; said mandrel has a first end and a second end; said first end of said mandrel is disposed adjacent said central portion of said robot head; said second end of said mandrel is configured to be disposed toward said at least one projection; said casing has an inner surface and an outer surface; said inner surface of said casing is disposed about said outer surface of said mandrel; said casing having a first end and a second and; and said first end of said casing being disposed adjacent said central portion of said robot head.

Another feature of the invention resides broadly in the device wherein said apparatus to adjust the diameter of said casing comprises: said casing being divided in at least two portions, said portions of said casing being divided along the longitudinal axis of said robot head; said mandrel having a tapered outer diameter, said outer diameter of said mandrel being greater at said second end of said mandrel than at said first end of said mandrel; said casing having an inner diameter; said inner diameter of said casing being larger at said second end of said casing than at said first end of said casing; at least one first spring; said at least one first spring being disposed about said casing to tension said casing against said mandrel; at least one second spring; said at least one second spring being disposed to push said casing away from said central portion of said robot head to allow the diameter of said casing to increase against the action of said at least one first spring.

Yet another feature of the invention resides broadly in the device wherein: each of said at least one projection structure comprises a recessed region; said second end of said mandrel comprises a conical section; and said conical section of said second end of said mandrel is disposed and configured to fit into said recessed region of each of said at least one projection structure.

Still another feature of the invention resides broadly in the device comprising a computer control system to automatically control the operation of said handling and storing device.

A further feature of the invention resides broadly in the device wherein said computer control system is configured to automatically control the operation of said handling and storing device and a slitter to which said handling and storing device supplies tool sets.

Another feature of the invention resides broadly in the device for handling and storing cutters and spacers for a slitter mill, said handling and storing device comprising: at least one storage unit, said at least one storage unit having an elongated dimension; said at least one storage unit having a longitudinal axis along the elongated dimension; said at least one storage unit comprising at least one projection structure; each of said at least one projection structure comprising a projection for storage of cutters and spacers; said at least one projection having an elongated dimension and having a longitudinal axis along the elongated dimension; the longitudinal axis of said at least one projection being disposed substantially transverse to the longitudinal axis of said at least one storage unit; the longitudinal axis of said at least one storage unit being substantially vertical; the longitudinal axis of each of said at least one projection being substantially horizontal; a robot to move cutters and spacers, said robot comprising: a robot head having an elongated dimension; said robot head having a longitudinal axis along the elongated dimension; said robot head being rotatable in the plane of its longitudinal axis; and the longitudinal axis of said robot head being disposed substantially transverse to the longitudinal axis of said at least one storage unit.

Yet another feature of the invention resides broadly in the device wherein: said robot head comprises a casing; said casing has a diameter, the diameter being substantially transverse to the longitudinal axis of said robot head; said robot head comprises apparatus to adjust the diameter of said casing between a first diameter and a second diameter; said robot head is configured and disposed to permit engagement of said robot head with said at least one projection; said apparatus to adjust the diameter of said casing is disposed and configured to adjust the diameter of said casing to the first diameter upon said casing not being engaged with said said at least one projection, the first diameter being substantially equal to the inside diameter of stored cutters and spacers to hold cutters and spacers on said casing; and said apparatus to adjust the diameter of said casing is disposed and configured to adjust the diameter of said casing to the second diameter upon said casing being engaged with said at least one projection, the second diameter being substantially less than the inside diameter of stored cutters and spacers to allow cutters and spacers to move along said casing.

Still another feature of the invention resides broadly in the device wherein said robot comprises: a first carriage; said robot head being connected to said first carriage; said first carriage being disposed and configured to allow movement of said robot head in a first direction; a second carriage; said robot head being connected to said second carriage; said second carriage being disposed and configured to allow movement of said robot head in a second direction, the second direction being substantially transverse to the first direction; apparatus to move said robot head substantially transverse to said first direction and said second direction; said robot head being connected to said moving apparatus; and said moving apparatus being configured and disposed to allow movement of said robot head in a third direction, the third direction being substantially transverse to both the first direction and the second direction.

A further feature of the invention resides broadly in the device wherein each of said at least one projection structure comprises a pusher to displace cutters and spacers stored on its corresponding projection.

Another feature of the invention resides broadly in the device wherein: said robot head comprises a holder; and said holder is disposed and configured to limit the number of cutters and spacers which can be held by said casing.

Yet another feature of the invention resides broadly in the device wherein: said robot head comprises a central portion, said central portion being disposed adjacent said moving apparatus; said robot head comprises a mandrel, said mandrel has an outer surface; said mandrel has a first end and a second end; said first end of said mandrel is disposed adjacent said central portion of said robot head; said second end of said mandrel is configured to be disposed toward said at least one projection; said casing has an inner surface and an outer surface; said inner surface of said casing is disposed about said outer surface of said mandrel; said casing having a first end and a second and; and said first end of said casing being disposed adjacent said central portion of said robot head.

Still another feature of the invention resides broadly in the device wherein said apparatus to adjust the diameter of said casing comprises: said casing being divided in at least two portions, said portions of said casing being divided along the longitudinal axis of said robot head; said mandrel having a tapered outer diameter, said outer diameter of said mandrel being greater at said second end of said mandrel than at said first end of said mandrel; said casing having an inner diameter; said inner diameter of said casing being larger at said second end of said casing than at said first end of said casing; at least one first spring; said at least one first spring being disposed about said casing to tension said casing against said mandrel; at least one second spring; said at least one second spring being disposed to push said casing away from said central portion of said robot head to allow the diameter of said casing to increase against the action of said at least one first spring.

A further feature of the invention resides broadly in the device wherein: each of said at least one projection comprises a recessed region; said second end of said mandrel comprises a conical section; and said conical section of said second end of said mandrel is disposed and configured to fit into said recessed region of each of said at least one projection.

Another feature of the invention resides broadly in the device comprising a computer control system to automatically control the operation of said handling and storing device.

Yet another feature of the invention resides broadly in the device wherein said computer control system is configured to automatically control the operation of said handling and storing device and also a slitter to which said handling and storing device supplies tool sets.

Still another feature of the invention resides broadly in the device comprising a set-up area to transfer tool sets from the device to a slitter and to store additional tool sets.

A further feature of the invention resides broadly in the method of replacing cutters and spacers on a slitter with a device for handling and storing cutters and spacers for a slitter mill, said handling and storing device comprising: at least one storage unit, said at least one storage unit having an elongated dimension; said at least one storage unit having a longitudinal axis along the elongated dimension; said at least one storage unit comprising at least one projection structure; each of said at least one projection structure comprising a projection for storage of cutters and spacers; said at least one projection having an elongated dimension and having a longitudinal axis along the elongated dimension; the longitudinal axis of said at least one projection being disposed substantially transverse to the longitudinal axis of said at least one storage unit; the longitudinal axis of said at least one storage unit being substantially vertical; the longitudinal axis of each of said at least one projection being substantially horizontal; a robot to move cutters and spacers, said robot comprising: a robot head having an elongated dimension; said robot head having a longitudinal axis along the elongated dimension; said robot head being rotatable in the plane of its longitudinal axis; and the longitudinal axis of said robot head being disposed substantially transverse to the longitudinal axis of said at least one storage unit; said method comprising the steps of: removing at least one of a cutter and a spacer from a slitter; transferring the at least one of a cutter and a spacer onto the robot head; moving the robot head to the substantially horizontal projection of the at least one projection structure of the at least one storage unit on which the at least one of a cutter and a spacer are to be stored; transferring the removed at least one of a cutter and a spacer to the substantially horizontal projection of the at least one projection structure of the at least one storage unit; moving the robot head adjacent the substantially horizontal projection of the at least one projection structure of the at least one storage unit containing at least one of a cutter and a spacer to be installed on the slitter; transferring the at least one of a cutter and a spacer to be installed on the slitter from the substantially horizontal projection of the at least one projection structure of the at least one storage unit onto the robot head; moving the robot head adjacent the slitter for installation of the at least one of a cutter and a spacer; and installing the at least one of a cutter and a spacer onto the slitter for cutting strips of material.

Another feature of the invention resides broadly in the method wherein: said robot head comprises a casing; said casing has a diameter, the diameter being substantially transverse to the longitudinal axis of said robot head; said robot head comprises apparatus to adjust the diameter of said casing between a first diameter and a second diameter; said robot head is configured and disposed to permit engagement of said robot head with said at least one projection; said apparatus to adjust the diameter of said casing is disposed and configured to adjust the diameter of said casing to the first diameter upon said casing not being engaged with said said at least one projection, the first diameter being substantially equal to the inside diameter of stored cutters and spacers to hold cutters and spacers on said casing; and said apparatus to adjust the diameter of said casing is disposed and configured to adjust the diameter of said casing to the second diameter upon said casing being engaged with said at least one projection, the second diameter being substantially less than the inside diameter of stored cutters and spacers to allow cutters and spacers to move along said casing: said method further comprising the steps of: securing the at least one of a cutter and a spacer onto the casing of the robot head by the apparatus to adjust the diameter of the casing, before the step of moving the robot head to the substantially horizontal projection of the at least one projection structure of the at least one storage unit on which the at least one of a cutter and a spacer are to be stored; releasing the at least one of a cutter and a spacer from the casing of the robot head by the apparatus to adjust the diameter of the casing, after the step of moving the robot head to the substantially horizontal projection of the at least one projection structure of the at least one storage unit on which the at least one of a cutter and a spacer are to be stored; securing the at least one of a cutter and a spacer onto the casing of the robot head by the apparatus to adjust the diameter of the casing, before the step of moving the robot head adjacent the slitter for installation of the at least one of a cutter and a spacer; and releasing the at least one of a cutter and a spacer from the casing of the robot head by the apparatus to adjust the diameter of the casing, after the step of moving the robot head adjacent the slitter for installation of the at least one of a cutter and a spacer.

U.S. patent application Ser. No. 08/890,860, entitled "Splitting Apparatus for Splitting Coils of Metal such as Steel and Aluminum and Coils of Other Materials Into Strips" filed on Jul. 10, 1997, is hereby incorporated by reference as if set forth in its entirety herein.

Slitters or components thereof, which may be used in embodiments of the present invention, may be found in the following U.S. Pat.: No. 5,735,782, issued Apr. 7, 1998 to Berg; No. 5,183,377, issued February 1993 to Becker et al.; No. 5,044,064, issued September 1991 to Muselli; No. 4,802,274, issued February 1989 to Petrof et al.; No. 4,655,676, issued April 1987 to Jannborg et al.; No. 4,587,716, issued May 1986 to Bytow; No. 4,183,273, issued January 1980 to Greinke et al.; No. 4,164,879, issued August 1979 to Martin; and No. 3,727,503, issued April 1973 to Braner et al.

Collets and components thereof, which may be used in embodiments of the present invention, may be found in the following U.S. Pat.: No. 5,382,030, issued Jan. 17, 1995 to Kanaan; No. 5,383,673, issued Jan. 24, 1995 to Mogilnicki; No. 5,397,135, issued Mar. 14, 1995 to Smith; No. 5,398,947, issued Mar. 21, 1995 to Cook; No. 5,402,580, issued Apr. 4, 1995 to Seto et al.; and No. 5,439,310, issued Aug. 8, 1995 to Evenson et al.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A device for handling and storing cutters and spacers for a slitter mill, which slitter mill cuts strips from coils of material such as steel, aluminum or plastic, said handling and storing device comprising:

at least one storage unit, said at least one storage unit having an elongated dimension;

said at least one storage unit having a longitudinal axis along the elongated dimension;

said at least one storage unit comprising at least one projection structure;

each of said at least one projection structure comprising a projection for storage of cutters and spacers;

said at least one projection having an elongated dimension and having a longitudinal axis along the elongated dimension;

the longitudinal axis of said at least one projection being disposed substantially transverse to the longitudinal axis of said at least one storage unit;

the longitudinal axis of said at least one storage unit being substantially vertical;

each of said at least one projection structure comprising a pusher to displace cutters and spacers stored on the corresponding projection;

a robot to move cutters and spacers, said robot comprising:
  a robot head having an elongated dimension;
  said robot head having a longitudinal axis along the elongated dimension;
  said robot head being rotatable in the plane of its longitudinal axis;
  the longitudinal axis of said robot head being disposed substantially transverse to the longitudinal axis of said at least one storage unit;
  a first carriage;
  said robot head being connected to said first carriage;
  said first carriage being disposed and configured to allow movement of said robot head in a first direction;
  a second carriage;
  said robot head being connected to said second carriage;
  said second carriage being disposed and configured to allow movement of said robot head in a second direction, the second direction being substantially transverse to the first direction; and
  apparatus to move said robot head substantially transverse to said first direction and said second direction;
  said robot head being connected to said moving apparatus;
  said moving apparatus being configured and disposed to allow movement of said robot head in a third direction, the third direction being substantially transverse to both the first direction and the second direction;

said robot head comprising a casing;

said casing having an elongated dimension and having a longitudinal axis along said elongated dimension;

the longitudinal axis of said casing being disposed along the longitudinal axis of said robot head;

said casing having a diameter, the diameter being substantially transverse to the longitudinal axis of said robot head;

said robot head comprising apparatus to adjust the diameter of said casing between a first diameter and a second diameter;

said robot head being configured and disposed to permit engagement of said robot head with said at least one projection;

said apparatus to adjust the diameter of said casing being disposed and configured to adjust the diameter of said casing to the first diameter upon said casing not being engaged with said at least one projection, the first diameter being substantially equal to the inside diameter of stored cutters and spacers to hold cutters and spacers on said casing; and said apparatus to adjust the diameter of said casing being disposed and configured to adjust the diameter of said casing to the second diameter upon said casing being engaged with said at least one projection, the second diameter being substantially less than the inside diameter of stored cutters and spacers to allow cutters and spacers to move along said casing.

2. The device according to claim 1 wherein:

said robot head comprises a holder; and said holder is disposed and configured to limit the number of cutters and spacers which can be held by said casing.

3. The device according to claim 2 wherein:

said robot head comprises a central portion, said central portion being disposed adjacent said moving apparatus;

said robot head comprises a mandrel, said mandrel has an outer surface;

said mandrel has a first end and a second end;

said first end of said mandrel is disposed adjacent said central portion of said robot head;

said second end of said mandrel is configured to be disposed toward said at least one projection;

said casing has an inner surface and an outer surface;

said inner surface of said casing is disposed about said outer surface of said mandrel;

said casing having a first end and a second and; and said first end of said casing being disposed adjacent said central portion of said robot head.

4. The device according to claim 3 wherein said apparatus to adjust the diameter of said casing comprises:

said casing being divided in at least two portions, said portions of said casing being divided along the longitudinal axis of said robot head;

said mandrel having a tapered outer diameter, said outer diameter of said mandrel being greater at said second end of said mandrel than at said first end of said mandrel;

said casing having an inner diameter;
said inner diameter of said casing being larger at said second end of said casing than at said first end of said casing;
at least one first spring;
said at least one first spring being disposed about said casing to tension said casing against said mandrel;
at least one second spring;
said at least one second spring being disposed to push said casing away from said central portion of said robot head to allow the diameter of said casing to increase against the action of said at least one first spring.

5. The device according to claim 4 wherein:
each of said at least one projection structure comprises a recessed region;
said second end of said mandrel comprises a conical section; and
said conical section of said second end of said mandrel is disposed and configured to fit into said recessed region of each of said at least one projection structure.

6. The device according to claim 5 comprising a computer control system to automatically control the operation of said handling and storing device.

7. The device according to claim 6 wherein said computer control system is configured to automatically control the operation of said handling and storing device and a slitter to which said handling and storing device supplies tool sets.

8. A device for handling and storing cutters and spacers for a slitter mill, said handling and storing device comprising:
  at least one storage unit, said at least one storage unit having an elongated dimension;
  said at least one storage unit having a longitudinal axis along the elongated dimension;
  said at least one storage unit comprising at least one projection structure;
  each of said at least one projection structure comprising a projection for storage of cutters and spacers;
  said at least one projection having an elongated dimension and having a longitudinal axis along the elongated dimension;
  the longitudinal axis of said at least one projection being disposed substantially transverse to the longitudinal axis of said at least one storage unit;
  the longitudinal axis of said at least one storage unit being substantially vertical;
  the longitudinal axis of each of said at least one projection being substantially horizontal;
  a robot to move cutters and spacers, said robot comprising:
    a robot head having an elongated dimension;
    said robot head having a longitudinal axis along the elongated dimension;
    said robot head being rotatable in the plane of its longitudinal axis; and
    the longitudinal axis of said robot head being disposed substantially transverse to the longitudinal axis of said at least one storage unit.

9. The device according to claim 8 wherein:
said robot head comprises a casing;
said casing has a diameter, the diameter being substantially transverse to the longitudinal axis of said robot head;
said robot head comprises apparatus to adjust the diameter of said casing between a first diameter and a second diameter;
said robot head is configured and disposed to permit engagement of said robot head with said at least one projection;
said apparatus to adjust the diameter of said casing is disposed and configured to adjust the diameter of said casing to the first diameter upon said casing not being engaged with said said at least one projection, the first diameter being substantially equal to the inside diameter of stored cutters and spacers to hold cutters and spacers on said casing; and
said apparatus to adjust the diameter of said casing is disposed and configured to adjust the diameter of said casing to the second diameter upon said casing being engaged with said at least one projection, the second diameter being substantially less than the inside diameter of stored cutters and spacers to allow cutters and spacers to move along said casing.

10. The device according to claim 9 wherein said robot comprises:
a first carriage;
said robot head being connected to said first carriage;
said first carriage being disposed and configured to allow movement of said robot head in a first direction;
a second carriage;
said robot head being connected to said second carriage;
said second carriage being disposed and configured to allow movement of said robot head in a second direction, the second direction being substantially transverse to the first direction;
apparatus to move said robot head substantially transverse to said first direction and said second direction;
said robot head being connected to said moving apparatus; and
said moving apparatus being configured and disposed to allow movement of said robot head in a third direction, the third direction being substantially transverse to both the first direction and the second direction.

11. The device according to claim 10 wherein each of said at least one projection structure comprises a pusher to displace cutters and spacers stored on its corresponding projection.

12. The device according to claim 11 wherein:
said robot head comprises a holder; and
said holder is disposed and configured to limit the number of cutters and spacers which can be held by said casing.

13. The device according to claim 12 wherein:
said robot head comprises a central portion, said central portion being disposed adjacent said moving apparatus;
said robot head comprises a mandrel, said mandrel has an outer surface;
said mandrel has a first end and a second end;
said first end of said mandrel is disposed adjacent said central portion of said robot head;
said second end of said mandrel is configured to be disposed toward said at least one projection;
said casing has an inner surface and an outer surface;
said inner surface of said casing is disposed about said outer surface of said mandrel;
said casing having a first end and a second and; and
said first end of said casing being disposed adjacent said central portion of said robot head.

14. The device according to claim 13 wherein said apparatus to adjust the diameter of said casing comprises:

said casing being divided in at least two portions, said portions of said casing being divided along the longitudinal axis of said robot head;

said mandrel having a tapered outer diameter, said outer diameter of said mandrel being greater at said second end of said mandrel than at said first end of said mandrel;

said casing having an inner diameter;

said inner diameter of said casing being larger at said second end of said casing than at said first end of said casing;

at least one first spring;

said at least one first spring being disposed about said casing to tension said casing against said mandrel;

at least one second spring;

said at least one second spring being disposed to push said casing away from said central portion of said robot head to allow the diameter of said casing to increase against the action of said at least one first spring.

15. The device according to claim 14 wherein:

each of said at least one projection comprises a recessed region;

said second end of said mandrel comprises a conical section; and said conical section of said second end of said mandrel is disposed and configured to fit into said recessed region of each of said at least one projection.

16. The device according to claim 15 comprising a computer control system to automatically control the operation of said handling and storing device.

17. The device according to claim 16 wherein said computer control system is configured to automatically control the operation of said handling and storing device and also a slitter to which said handling and storing device supplies tool sets.

18. The device according to claim 17 comprising a set-up area to transfer tool sets from the device to a slitter and to store additional tool sets.

19. A method of replacing cutters and spacers on a slitter with a device for handling and storing cutters and spacers for a slitter mill, said handling and storing device comprising: at least one storage unit, said at least one storage unit having an elongated dimension; said at least one storage unit having a longitudinal axis along the elongated dimension; said at least one storage unit comprising at least one projection structure; each of said at least one projection structure comprising a projection for storage of cutters and spacers; said at least one projection having an elongated dimension and having a longitudinal axis along the elongated dimension; the longitudinal axis of said at least one projection being disposed substantially transverse to the longitudinal axis of said at least one storage unit; the longitudinal axis of said at least one storage unit being substantially vertical; the longitudinal axis of each of said at least one projection being substantially horizontal; a robot to move cutters and spacers, said robot comprising: a robot head having an elongated dimension; said robot head having a longitudinal axis along the elongated dimension; said robot head being rotatable in the plane of its longitudinal axis; and the longitudinal axis of said robot head being disposed substantially transverse to the longitudinal axis of said at least one storage unit; said method comprising the steps of:

removing at least one of a cutter and a spacer from a slitter;

transferring the at least one of a cutter and a spacer onto the robot head;

moving the robot head to the substantially horizontal projection of the at least one projection structure of the at least one storage unit on which the at least one of a cutter and a spacer are to be stored;

transferring the removed at least one of a cutter and a spacer to the substantially horizontal projection of the at least one projection structure of the at least one storage unit;

moving the robot head adjacent the substantially horizontal projection of the at least one projection structure of the at least one storage unit containing at least one of a cutter and a spacer to be installed on the slitter;

transferring the at least one of a cutter and a spacer to be installed on the slitter from the substantially horizontal projection of the at least one projection structure of the at least one storage unit onto the robot head;

moving the robot head adjacent the slitter for installation of the at least one of a cutter and a spacer; and installing the at least one of a cutter and a spacer onto the slitter for cutting strips of material.

20. The method according to claim 19 wherein: said robot head comprises a casing; said casing has a diameter, the diameter being substantially transverse to the longitudinal axis of said robot head; said robot head comprises apparatus to adjust the diameter of said casing between a first diameter and a second diameter; said robot head is configured and disposed to permit engagement of said robot head with said at least one projection; said apparatus to adjust the diameter of said casing is disposed and configured to adjust the diameter of said casing to the first diameter upon said casing not being engaged with said said at least one projection, the first diameter being substantially equal to the inside diameter of stored cutters and spacers to hold cutters and spacers on said casing; and said apparatus to adjust the diameter of said casing is disposed and configured to adjust the diameter of said casing to the second diameter upon said casing being engaged with said at least one projection, the second diameter being substantially less than the inside diameter of stored cutters and spacers to allow cutters and spacers to move along said casing: said method further comprising the steps of:

securing the at least one of a cutter and a spacer onto the casing of the robot head by the apparatus to adjust the diameter of the casing, before the step of moving the robot head to the substantially horizontal projection of the at least one projection structure of the at least one storage unit on which the at least one of a cutter and a spacer are to be stored;

releasing the at least one of a cutter and a spacer from the casing of the robot head by the apparatus to adjust the diameter of the casing, after the step of moving the robot head to the substantially horizontal projection of the at least one projection structure of the at least one storage unit on which the at least one of a cutter and a spacer are to be stored;

securing the at least one of a cutter and a spacer onto the casing of the robot head by the apparatus to adjust the diameter of the casing, before the step of moving the robot head adjacent the slitter for installation of the at least one of a cutter and a spacer; and releasing the at least one of a cutter and a spacer from the casing of the robot head by the apparatus to adjust the diameter of the casing, after the step of moving the robot head adjacent the slitter for installation of the at least one of a cutter and a spacer.

* * * * *

UNITED STATES PATENT AND TRADEMARK OFFICE
CERTIFICATE OF CORRECTION

PATENT NO. : 6,010,441
DATED : January 4, 2000
INVENTOR(S) : Björn ÅGREN

It is certified that error appears in the above-indentified patent and that said Letters Patent is hereby corrected as shown below:

In column 16, line 55, Claim 3, after 'second', delete "and;" and insert --end;--.

In column 18, line 63, Claim 13, after 'second', delete "and;" and insert --end;--.

Signed and Sealed this

Twenty-seventh Day of February, 2001

Attest:

NICHOLAS P. GODICI

*Attesting Officer*   *Acting Director of the United States Patent and Trademark Office*